Sept. 11, 1934.  M. SCHENKEL  1,973,110
ARC RECTIFIER
Filed May 4, 1932
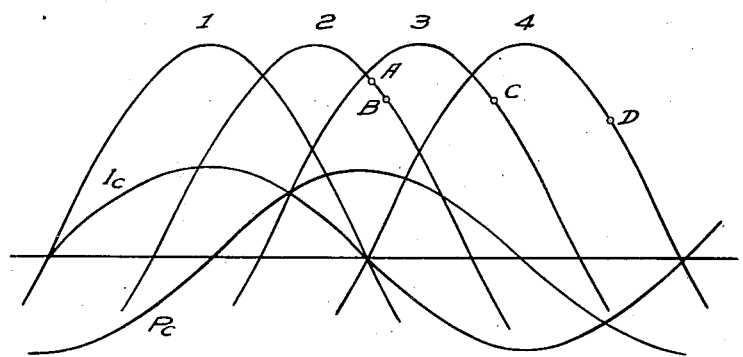
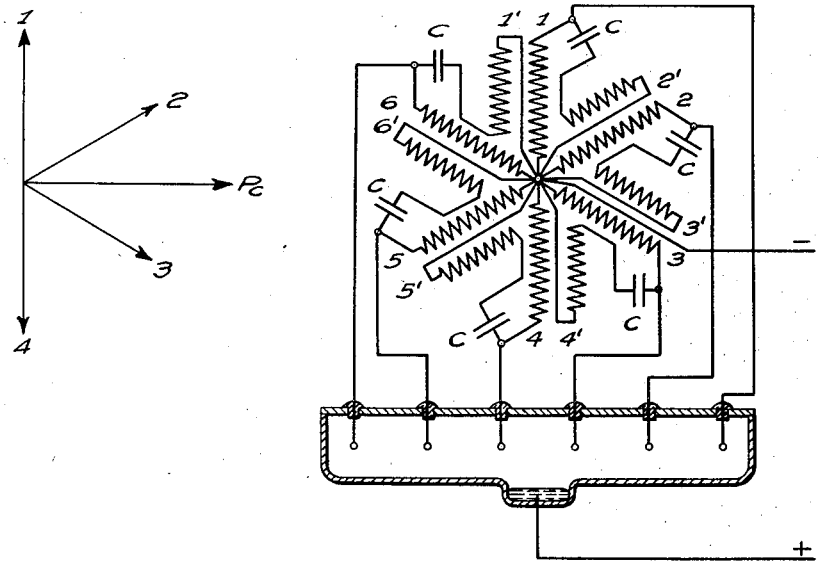
WITNESSES:
E. A. McCloskey.
S. A. Stricklett
INVENTOR
Moritz Schenkel.
BY O. F. Buchanan
ATTORNEY Patented Sept. 11, 1934

1,973,110

UNITED STATES PATENT OFFICE 1,973,110

ARC RECTIFIER

Moritz Schenkel, Berlin-Charlottenburg, Germany, assignor to Westinghouse Electric & Manufacturing Company, a corporation of Pennsylvania Application May 4, 1932, Serial No. 609,293
In Germany May 5, 1931

3 Claims. (Cl. 175—363)

My invention relates to arc rectifiers, and more particularly to a transformer connection for controlled mercury arc rectifiers.

Controlled vapor-electric rectifiers, which may be used for the control of voltage, return of energy to the network, frequency transformation and for several other purposes, employ as a rule according to the nature of the control in the vapor arc the descending slopes of the sine curves of the supplied alternating voltages. The reason for this is that the arc in the rectifier may be started by the control at any interval whatever, but as soon as it has been ignited it can no longer be extinguished by the rectifier control. It is necessary to wait until the supply voltage has attained the zero value; the arc is then extinguished by itself.

The use of the descending slopes of the curves of the supplied alternating voltage has the effect that the passage of the current from one phase to the other bring about disturbances which make themselves conspicuous during the operation of the rectifier, so that owing to the stray self-induction of the phases of the feeding transformer, a voltage drop occurs which is considerably higher, when utilizing the descending slopes of the curves of supplied alternating voltage than if the crest of the sine curve is used, as is the case in the usual operation of rectifiers.

The object of the invention is to provide means to obviate the above drawback. In reducing my invention to practice, the property of condensers of drawing a leading current is taken advantage of, besides utilizing the curve of supplied voltage only on the descending slopes, i. e., relatively late. In this manner it is possible to have a condenser completely charged, owing to the leading current drawn, already at the time, at which one of the phases is started with aid of the control of the rectifier for the supply of current; and if this condenser is also used to supply current, a portion of the current will be supplied by this condenser, thus releasing the phase which supplies current. Consequently, the condenser contributes to maintain the voltage of that phase.

Figure 1 is a diagrammatic illustration of the voltage relationship in a rectifier according to my invention.

Fig. 2 is a vectorial representation of the phase position of the transformer voltages, and Fig. 3 is a schematic illustration of a transformer connection according to my invention.

In Figure 1, numerals 1, 2, 3, 4 denote, for instance, the phase voltages of a six-phase transformer feeding a controlled vacuum device. It is assumed that the phase 2 is the one which is to be started for supplying current at a certain moment, for instance at the point A on the curve 2. The curve designated by $I_c$ represents the charging current of a condenser and is, as will be seen from Figure 1, displaced in such a manner that the charge of the condenser is terminated when the voltage 2 is applied to the control at the point A on curve 2. With six phases this would occur as soon as the voltage of the phase 2 attains the value 0,866 of its amplitude. In the case of transformers having a different number of phase another point should be chosen.

Under circumstances, it may be preferable, depending upon the selection of point A on curve 2 at which point the voltage is to be applied to the control, to displace the curve $I_c$ in phase. To this end, means known to those skilled in the art are employed. As will be apparent from the position of the curve $I_c$, the condenser would continue to supply current, even if a point that lags point A, for instance, point B would be chosen for starting the phase 2 since the condenser possesses then still a sufficient charge.

Should the rectifier be employed for voltage control, i. e., if the starting points A or B are used, which lie at the same height on all transformer phases 1, 2, 3 etc., it suffices to cause a phase displacement of the curve of current $I_c$ in a fixed relation. If the same rectifier is employed for frequency transformation, for which purpose the points A, C, D lying at different heights on the different phases are chosen for applying the voltages to the control, a fixed phase relation of the curve $I_c$ is also sufficient, since, in accordance with the voltage drop, also a smaller current is to be supplied; it is, therefore, sufficient if the condenser is already somewhat discharged at the time it begins to operate.

According to Figure 1 the curve of current $I_c$ of the condenser is brought about by supplying a voltage corresponding to the curve of the position $P_c$.

This curve of voltage must, as soon as the condenser has obtained below the point A its full charge, reach its maximum value at this moment, i. e., in the case of the six-phase device under consideration, the voltage $P_c$ must lag for instance the phase 1 by 90°. Such a charging voltage for the condenser is attained by using for instance the voltages of the phases 2 and 3 to charge the condenser or such voltages which are of the same phase and proportional to voltages 2 and 3.

In the vector diagram, Figure 2, are shown the voltages 1-6 of the six phases according to Figure 1 as well as the position of the voltage $P_c$ in relation to the six voltages.

Figure 3 shows a connection according to the invention. It represents the secondary winding of a six-phase transformer, whose six phases 1, 2, 3, 4 etc. are connected to the neutral 0. The phases 1 and 4, 3 and 6, 5 and 2 are wound in pairs on the limbs of the three-limb three-phase transformer. In parallel relation to each phase winding, separate auxiliary windings 1', 2', 3', 4', 5' and 6' are wound, which produce voltages corresponding to those of the phases. It is, therefore, possible to provide the necessary voltage $P_c$ for the condenser C, for instance, connected to that phase 2, by connecting in series the positive winding directions of 2 and 3'.

The same may be done systematically for every other phase. According to Figure 3 the auxiliary winding 4' with the phase 3, the auxiliary winding 5' with the phase 4 etc. are, therefore, connected to capacitors associated respectively with 3 and 4, 4 and 5 etc.

The operation of the device is as follows:

Assuming that the additional circuits are not present which consist of a capacitor C and an auxiliary winding, the current which has just flown to the phase 1 would have to pass over to the phase 2. This phase 2 would offer a certain resistance to the passing of the current as a result of the stray-field set up in the phase 2 which resistance causes a voltage drop owing to the current set up in the phase. This voltage drop is opposed to the instantaneous voltage of the phase 2. At this moment, a voltage drop in phase 2 would therefore occur and the voltage would only then raise when the passing over of the current is terminated. If the additional circuit with auxiliary winding and condenser is, however, connected in parallel relation to the winding to be accordingly energized, the capacitor will take over the supply of the first surge, i. e., the capacitor effects the passage of the current. The current supplied in this manner from the capacitor to the rectifier anode of the phase 2 must flow through the phase 3' and causes there a certain voltage drop. The latter may, however, be then neglected, if the capacitor C is amply dimensioned so as to supply the necessary current.

The passage of the current will, however, as a matter of fact be effected in such a manner that owing to the voltage drop in the winding 3', the voltage of the auxiliary circuit will drop to a slight extent, and consequently the phase 2 is also caused to take over the current, since the voltage of phase 2 does not drop for the time being. On the whole, a smaller voltage drop will, therefore, be brought about by the current supplied by the capacitor C than would be the case without this capacitor. This voltage drop may even be reduced to zero or an increase of voltage may be effected by giving the winding 3' a somewhat greater number of turns than the winding 3 has. After terminating the change-over operation, the capacitor may be completely discharged. The capacitor, therefore, need only be so dimensioned as to correspond to the inductive stray voltage drop of each main phase of the transformer, for if this inductive stray-voltage drop were so small that the time of passage would be very short, the capacitor would not be theoretically necessary, i. e., the capacity in this case would be zero.

I claim:

1. A transformer connection for an arc type rectifier comprising a polyphase transformer secondary winding, a condenser connected for discharging in parallel with each of said windings and means for charging said condenser from another phase of the transformer winding.

2. A supply system for a controlled rectifier comprising a polyphase transformer secondary adapted for supplying current to a controlled rectifier, capacitors for supplying current in parallel with each phase of said transformer secondary and a winding associated with a phase other than that with which said capacitor discharges for charging the capacitor.

3. A supply system for maintaining the regulation of a controlled vapor-electric device comprising a transformer having a winding for supplying current to the device, a capacitor for supplying the initial current demanded of said winding, said capacitor having a capacity substantially equal to the self-inductance of said winding and an auxiliary winding for supplying a charging current for said capacitor out of phase with the current in said current carrying winding.

MORITZ SCHENKEL.